(12) United States Patent
Lin et al.

(10) Patent No.: US 8,411,901 B2
(45) Date of Patent: Apr. 2, 2013

(54) METHOD AND SYSTEM FOR CALCULATING IMAGE RECOGNITION RATE AND EMBEDDED IMAGE PROCESSING SYSTEM

(75) Inventors: Che-Chung Lin, Hsinchu (TW); Chi-Wei Lin, Taipei (TW); Dau-Chen Huang, Taichung County (TW); Yu-Long Wang, Tainan (TW)

(73) Assignee: Industrial Technology Research Institute, Hsin-Chu (TW)

( * ) Notice: Subject to any disclaimer, the term of this patent is extended or adjusted under 35 U.S.C. 154(b) by 378 days.

(21) Appl. No.: 12/831,023

(22) Filed: Jul. 6, 2010

(65) Prior Publication Data
US 2011/0158480 A1   Jun. 30, 2011

(30) Foreign Application Priority Data
Dec. 29, 2009   (TW) .............................. 98145458 A

(51) Int. Cl.
*G06K 9/00* (2006.01)
(52) U.S. Cl. .......................................... 382/104; 700/46
(58) Field of Classification Search ........................ None
See application file for complete search history.

(56) References Cited

U.S. PATENT DOCUMENTS

| | | | |
|---|---|---|---|
| 4,942,533 A | | 7/1990 | Kakinami et al. |
| 6,334,181 B1 * | | 12/2001 | Boutaud et al. ................. 712/38 |
| 7,295,682 B2 | | 11/2007 | Otsuka et al. |
| 2003/0169902 A1 * | | 9/2003 | Satoh ............................ 382/104 |
| 2007/0140527 A1 * | | 6/2007 | Yamamoto et al. ........... 382/104 |
| 2008/0046150 A1 * | | 2/2008 | Breed .............................. 701/45 |
| 2008/0049975 A1 * | | 2/2008 | Stiegler ......................... 382/104 |
| 2008/0136612 A1 * | | 6/2008 | Machii et al. ................. 340/435 |
| 2009/0245582 A1 * | | 10/2009 | Sakamoto ..................... 382/104 |
| 2010/0284577 A1 * | | 11/2010 | Hua et al. ...................... 382/118 |

FOREIGN PATENT DOCUMENTS

| CN | 101236599 A | 8/2008 |
|---|---|---|
| CN | 101599207 A | 12/2009 |

OTHER PUBLICATIONS

State Intellectual Property Office of the People'S Republic of China, "Office Action", Apr. 1, 2012, China.
State Intellectual Property Office of the People's Republic of China, "Office Action", Jan. 7, 2013, China.

* cited by examiner

*Primary Examiner* — Andrew W Johns
*Assistant Examiner* — Siamak Harandi
(74) *Attorney, Agent, or Firm* — Morris Manning & Martin LLP; Tim Tingkang Xia, Esq.

(57) ABSTRACT

The present invention provides a method and system for calculating image recognition rate, which automatically calculates the recognition rate according to recognizing result obtained from an embedded image processing system whose images are provided by an image controlling apparatus. The image controlling apparatus provides an image frame each time according to a control signal issued by the embedded image processing system. The embedded image processing system receives the image frame and recognizes the same. After a plurality of image frames are recognized, it is capable of calculating the recognition rate according to the recognizing result of the embedded image processing system and the recognition rate is capable of being utilized to be a basis for optimizing the parameters used in recognizing logic of the embedded image processing system.

18 Claims, 5 Drawing Sheets

METHOD AND SYSTEM FOR CALCULATING IMAGE RECOGNITION RATE AND EMBEDDED IMAGE PROCESSING SYSTEM

CROSS-REFERENCE TO RELATED APPLICATIONS

This non-provisional application claims priority under 35 U.S.C. §119(a) on Patent Application No(s). 098145458 filed in Taiwan, R.O.C. on Dec. 29, 2009, the entire contents of which are hereby incorporated by reference.

TECHNICAL FIELD

The present disclosure relates to a method and system for calculating image recognition rate, and more particularly, to a method and system for calculating image recognition rate as well as an embedded image processing system using the same.

TECHNICAL BACKGROUND

Generally, common embedded image processing systems for lane and vehicle recognition are usually troubled by a problem that the image recognition rate of those embedded image processing systems can not be evaluated and accessed quantitatively in a scientific manner. This is because that although the conventional embedded image processing systems are used and performed as real-time systems, they can not process images as fast as the speed of images being inputted therein for processing since the calculation algorithm programmed therein for processing those inputted images are usually very complicated, not to mention that the more complex the imputed image is, the slower the processing speed of the embedded image processing systems will be. Consequently, it is hard to recognize an object by performing a pixel-to-pixel comparison between images with respect to the corresponding ground truth of the object in real time. Please refer to FIG. 1, which is a schematic diagram showing how a series of image frames is being processed by a conventional embedded image processing system. In the example shown in FIG. 1, the video containing a series of images to be recognized is recorded at a speed of 30 frames per second by that the elapsed time between two frames is approximately 33 ms, that is, there will be a frame being delivered to the embedded image processing system for processing every 33 ms. However, a certain amount of time is required for the embedded image processing system to recognize each frame. Taking the first frame 10 for instance, the required process time for the embedded image processing system is about 67 ms to 99 ms. Therefore, when the embedded image processing system is ready for processing the next frame, the fourth frame 13 in the video delivered after 99 ms is the one to be processed and the second and the third frames 11, 12 that are respectively being delivered at the time of 34 ms and 67 ms will be lost, i.e. the fourth frame 13 is sampled while the second and the third frames are not. In addition, since the processing times for different frames of different complexities will be different, not only the amount of frames being sampled by the embedded image processing system can not be ascertained, but also it can not ensure whether or not a specific frame in the video is sampled. Thus, for the conventional embedded image processing system, the recognition rate can be very hard to calculate and thus it is difficult to optimize the parameters used in recognizing logic of the embedded image processing system according to the recognition rate.

Moreover, as the video to be processed is usually subjected to multiple analog-digital conversions, the signal quality may deteriorate accordingly. Not to mention that there might be differences between a frame before conversion and the corresponding frame after conversion that is resulted from the multiple conversions. Consequently, it is difficult to achieve a global optimization for the embedded image processing system. Fundamentally, a means capable of calculating the recognition rate for embedded image processing system in an automatic manner is required. In view of this, if the embedded image processing system can be designed to be integrated with an image controlling apparatus for automatically calculating the recognition rate according to recognizing result obtained from the embedded image processing system whose images are provided by the image controlling apparatus, not only each and every frame in the video will be sampled for processing without any one to be lost, but also it is possible to process the frames repetitively according to a statistic model for enabling evaluating quantitatively the image recognition rates in a scientific manners with respect to different calculation algorithms resulting from the statistical model and thereafter to be used as basis for optimizing their corresponding calculation algorithms.

There are already many studies relating to the application of embedded image processing systems, such as a mobile range finder disclosed in U.S. Pat. No. 4,942,533 and a lane recognition system disclosed in U.S. Pat. No. 7,295,682. Nevertheless, the processing algorithms used in aforesaid embedded image processing systems are established basing upon human judgment and assessment that such embedded image processing systems are incapable of assessing and quantifying its performance in an objective and scientific manner. Thus, the actual image recognition rate of such embedded image processing system may greatly depart from the theoretical image recognition rate that is resulting from a processing algorithm optimized by developing engineers using a very small amount of sampled images. Thus, it is in need of a means capable of automatically processing a greatly amount of tested images for calculating image recognition rates accordingly.

TECHNICAL SUMMARY

The present disclosure relates to a method and system for calculating image recognition rate, by which an image controlling apparatus with signal processing and transmitting abilities and an embedded image processing system are integrated for enabling the two to work cooperatively in a manner that the image controlling apparatus is enabled to feed images to the image processing system for recognition in a frame by frame manner, and then the recognition result of the image processing system is transmitted to the image controlling apparatus to be used for calculating an image recognition rate. Since the image recognition rate is affected and changed with the variation of the parameters used in the recognition logic of the embedded image processing system, the image rate calculating method and system of the present disclosure is designed to use the image recognition rates obtained under different parameters as basis for optimizing the parameters used in the recognition logic of the embedded image processing system.

In an exemplary embodiment, the present disclosure provides a method for calculating image recognition rate, which comprises the steps of: enabling an image controlling apparatus to output a frame in a set of frames to an embedded image processing system according to a control signal; enabling the embedded image processing system to receive the frame so as to perform an image recognition operation upon the received frame; enabling the image processing system to issue the control signal after completing the image recognition operation; repeating the aforesaid steps for a plurality of times for generating a plurality of recognition results in correspondence to the plural image recognition operations performed during the repeating for recognizing each an every frame in the set of frames; and calculating an image recognition rate relating to the set of frames according to the recognition results from the embedded image processing system.

In another exemplary embodiment, the present disclosure provides a system for calculating image recognition rate, comprising: an image controlling apparatus, capable of outputting a frame according to a control signal; a first signal interface electrically connected to the image controlling apparatus, used for transmitting the frame; an embedded image processing system, electrically connected to the first signal interface so as to receive the frame, used for performing an image recognition operation upon the frame and thus generating a recognition result for the received frame while generating the control signal; a second signal interface, electrically connected to the embedded image processing system and the image controlling apparatus, used for receiving the recognition result and the control signal while transmitting the control signal and the recognition result to the image controlling apparatus where the recognition result is used as a basis for calculating an image recognition rate.

In further another exemplary embodiment, the present disclosure provides an embedded image processing system, comprising: a signal decoder, for receiving a frame while performing a conversion operation upon the received frame so as to form a digital image signal accordingly; a signal processor, configured with an optimal recognition parameter, for performing an image recognition operation upon the digital image signal so as to form a recognition result; and a signal transmitter, electrically connected to the signal processor for outputting the recognition result.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DESCRIPTION OF THE EXEMPLARY EMBODIMENTS

For your esteemed members of reviewing committee to further understand and recognize the fulfilled functions and structural characteristics of the disclosure, several exemplary embodiments cooperating with detailed description are presented as the follows.

Figure 1:
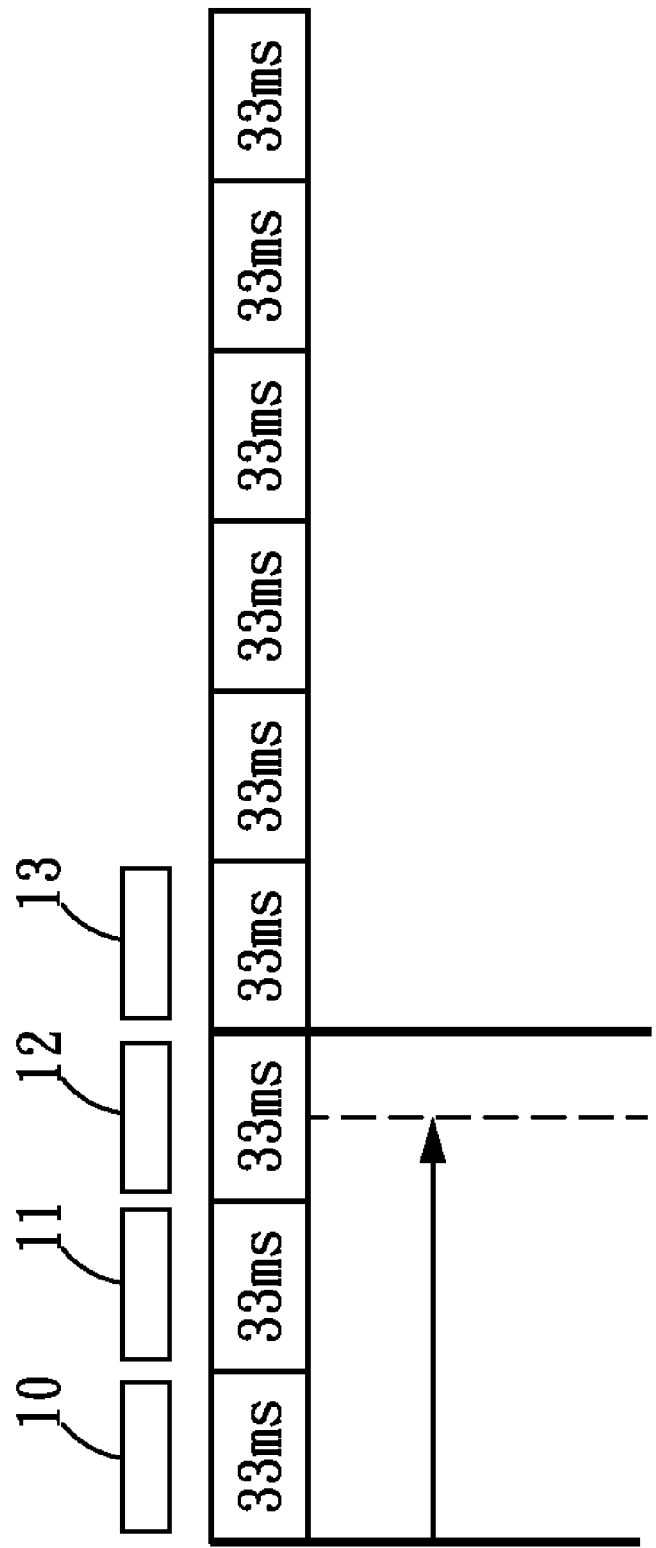
FIG. 1 is a schematic diagram showing how a series of image frames is being processed by a conventional embedded image processing system.
Figure 2:
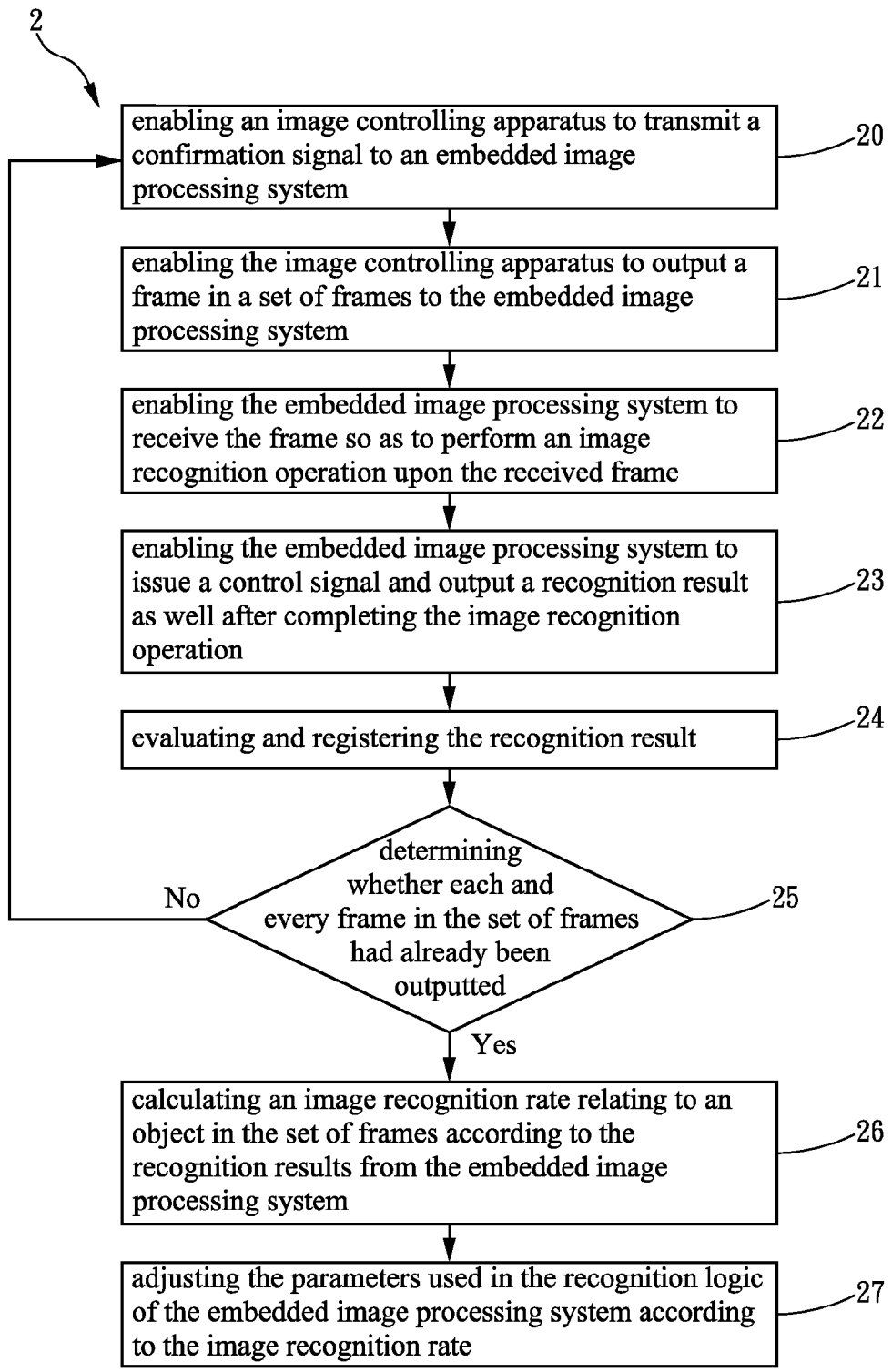
FIG. 2 is a flow chart depicting the steps of a method for calculating an image recognition rate according to an embodiment of the present disclosure.

Please refer to FIG. 2, which is a flow chart depicting the steps of a method for calculating an image recognition rate according to an embodiment of the present disclosure. A shown in FIG. 2, the flow of a method for calculating an image recognition rate 2 starts from step 20. At step 20, an image controlling apparatus is provided and enabled to transmit a confirmation signal to an embedded image processing system; and then the flow proceeds to step 21. It is noted that the image controlling apparatus can be a device with signal processing and transmitting abilities, such as a personal computer, a notebook computer, a workstation, a server or a personal digital assistant (PDA), but is not limited thereby; and the embedded image processing system can be a device with real-time image processing and recognition abilities, which is designed to receive images from the image controlling apparatus as soon as a control signal is received by its receiving end. Moreover, the interface configured on the embedded image processing system that is provided for receiving the confirmation signal can be a universal serial bus (USB) interface, or a RS232 interface. At step 21, the image controlling apparatus is enabled to start outputting a frame in a set of frames to the embedded image processing system; and then the flow proceeds to step 22. Clearly, the frame referring here is an image in a video captured at a specific point of time. For instance, when the video containing a series of images to be recognized is recorded at a speed of 30 frames per second, the elapsed time between two frames is approximately 33 ms, that is, the frames being delivered to the embedded image processing system for processing at step 21 are images sampled from the video every other 33 ms.

At step 22, the embedded image processing system is enabled to receive the frame so as to perform an image recognition operation upon the received frame; and then the flow proceeds to step 23. It is noted that the interface used by the image controlling apparatus for receiving the frame can be a universal serial bus (USB) interface, a D-sub terminal interface, or a digital visual interface (DVI), but is not limited thereby. As for the image recognition operation performed in the present disclosure, it can adopt any prior-art image recognition technique known to those skilled in the art. After completing the image recognition operation, a recognition result will be generated. Please refer to FIG. 3A, which is a schematic diagram showing a lane recognition result. In the embodiment shown in FIG. 3A, there is an image of a lane 90 captured in the frame that is received by the embedded image processing system, and the image recognition operation is performed for identifying lane lines. When the image recognition operation is performed for identifying lane lines, the corresponding recognition result should contain parameters for defining the location of the lane 90 in a reference coordinate system, and if the reference coordinate is a Cartesian coordinate system, the parameters are defined as the slopes $L\_a$, $L\_b$ and the interceptions $R\_a$, $R\_b$, relating to a left lane line and a right lane line of the lane 90. It is noted that the reference coordinate system is not restricted to be the Cartesian coordinate system, it can be any coordinate system capable of defining the parameters for recognizing the lane, such as a polar coordinate system (r, θ). In addition, please refer to FIG. 3B, which is a schematic diagram showing a vehicle recognition result. In the embodiment shown in FIG. 3B, there is an image of a vehicle 91 captured in the frame that is received by the embedded image processing system, and the image recognition operation is performed for identifying the vehicle. When a Cartesian coordinate system is used as the reference coordinate system, the parameters for defining the vehicle 91 includes the center of the vehicle as it is represented as a point (x, y) defined in a Cartesian coordinate system, the left vehicle width (WL), the right vehicle width (WR), the vehicle height (H). Similarly, the reference coordinate system is not restricted to be the Cartesian coordinate system, it can be any coordinate system capable of defining the parameters for recognizing the vehicle.

At step 23, the embedded image processing system is enabled to issue a control signal and output a recognition result as well after completing the image recognition operation; and then the flow proceeds to step 24. During the performing of the step 23, the control signal is sent to the image controlling apparatus for informing the same that the image recognition operation for the frame had already been completed by the embedded image processing system. At step 24, the recognition result is evaluated and registered; and then the flow proceeds to step 25. Taking the lane shown in FIG. 3A for example, the parameters identified by embedded image processing system and disclosed in the recognition result, i.e. L_a, L_b, R_a, and R_b, are compared with their corresponding ground truth that are obtained manually from the frame for determining whether the recognition result of the embedded image processing system is correct or not. In another embodiment, if the embedded image processing system is configured for recognizing human face, the recognition result should contain sufficient parameters capable of defining the position of characteristics, such as the eyes, on the human face in a reference space coordinate system, by that the embedded image processing system is able to determine whether a driver is dozing off or not.

There are two states can be identified from the recognition result, which are a correct state and an error state. There are two types of correct state. The first type of the correct state is referred as True Positive (TP), and in an embodiment, the TP represents the situation that there is a lane captured in the frame received by the embedded image processing system and the embedded image processing system is actually capable of identifying the correct location of the lane. The second type is referred as True Negative (TN), and in an embodiment, the TN represents the situation that there is no lane captured in the frame received by the embedded image processing system and the embedded image processing system is actually capable of identifying that there is no lane existed in the frame. Similarly, There are two types of error state. The first type of the correct state is referred as False Positive (FP), and in an embodiment, the FP represents the situation that there is no lane captured in the frame received by the embedded image processing system but the embedded image processing system determines that there is a lane existed in the frame. The second type is referred as False Negative (FN), and in an embodiment, the FN represents the situation that there is a lane captured in the frame received by the embedded image processing system but the embedded image processing system determines that there is no lane existed in the frame. After the completing of the step 24 for obtaining the recognition result, the flow proceeds to step 25. At step 25, an evaluation is made for determining whether each and every frame in the set of frames had already been outputted; if not, the flow proceeds to step 20 for repeating the step 20 to the step 24 until all the frames had been processed; otherwise, the flow proceeds to step 26.

After the evaluation performed in step 25 determines that all the frames had already been processed, the flow will proceeds to step 26. At step 26, an image recognition rate relating to an object in the set of frames is calculated according to the recognition results from the embedded image processing system; and then the flow proceeds to step 27. It is noted that the object can be selected from the group consisting of: a human face, a vehicle, a lane line, a parking space line and an obstacle; but is not limited thereby. When the lane is selected to be the target object for example and the total amount of TP obtained from all the recognition results relating to all the frames in the video is nTP, total amount of TN is nTN, total amount of FP is nFP, and total amount of FN is nFN, the image recognition rate relating to an object in the set of frames is calculated according to the following equation:

$$\text{Accuracy}=(nTP+nTN)/(nTP+nTN+nFP+nFN) \quad (1)$$

wherein, nTP: representing the amount of frames identified as TP;
nTN: representing the amount of frames identified as TN;
nFP: representing the amount of frames identified as FP;
nFN: representing the amount of frames identified as FN.

Figure 4:
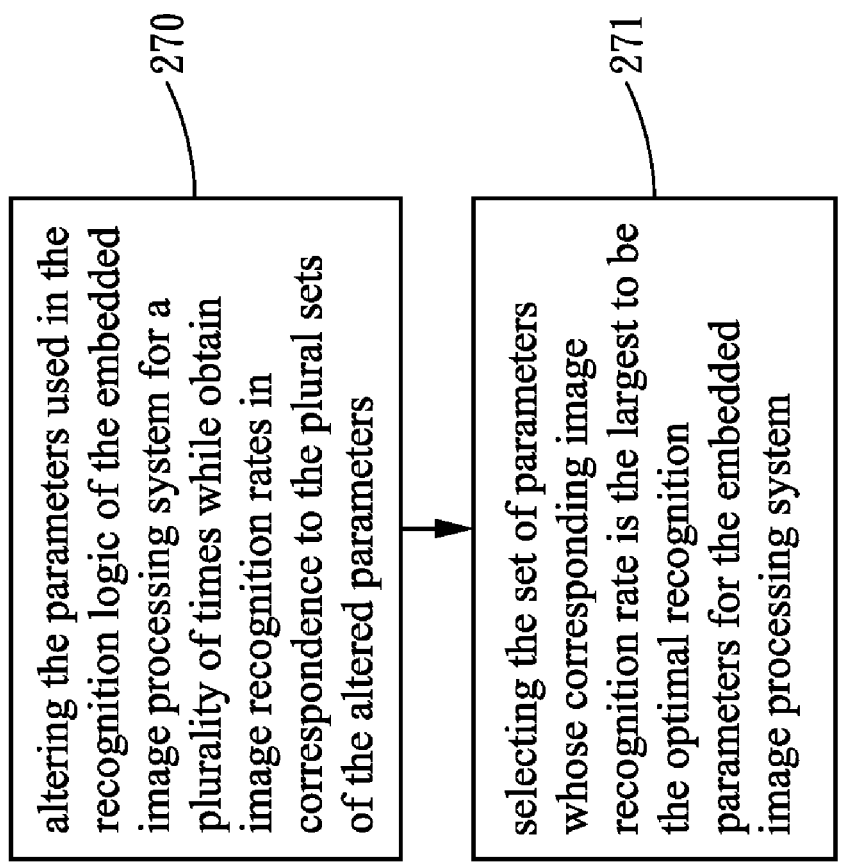
FIG. 4 is a flow chart depicting the steps for optimizing recognition parameters based upon image recognition rates according to an embodiment of the present disclosure.

After the image recognition rate is obtained the flow proceeds to step 27 for optimizing the image recognition rate. The optimizing is performed according to an evaluation for determining whether the parameters used in the recognition logic of the embedded image processing system are appropriate or not. That is, first, the parameters used in the recognition logic of the embedded image processing system are altered for a plurality of times for obtaining image recognition rates in correspondence to the plural sets of the altered parameters; and then, by comparing the plural image recognition rates with each other, the set of parameters whose corresponding image recognition rate is the largest can be selected to be the optimal recognition parameters for the embedded image processing system. Please refer to FIG. 4, which is a flow chart depicting the steps for optimizing recognition parameters based upon image recognition rates according to an embodiment of the present disclosure. The flow of FIG. 4 starts from the step 270. At step 270, the parameters used in the recognition logic of the embedded image processing system are altered for a plurality of times for obtaining image recognition rates in correspondence to the plural sets of the altered parameters; and then the flow proceeds to step 271. The performing of the step 270 is to first alter the parameters used in the recognition logic of the embedded image processing system, and then repeat the step 20 to 26 that are depicted in FIG. 2 for obtaining an image recognition rate corresponding to the altered parameters; and then after repeating the altering for several times, a plurality of image recognition rates can be obtained in correspondence to the plural sets of parameters. After obtaining the plural image recognition rates, the flow will proceeds to step 271 for selecting the set of parameters whose corresponding image recognition rate is the largest to be the optimal recognition parameters for the embedded image processing system. It is noted that the embedded image processing system whose parameters had already been optimized can be disposed inside any mobile carriers, such as a vehicle, while enabling the same to receive images captured by the imaging devices mounted on the mobile carrier to be used in an image recognition process Moreover, the imaging devices can be charged-coupled devices (CCD). In this embodiment, the parameters can be defined as the threshold value of a bi-level thresholding for image recognition, contrast, brightness and the combination thereof. In addition, the parameters can be defined and structured differently for conforming to various recognition logic programmed in the embedded image processing system according to different recognition requirements, so that they are not restricted by those described in the foregoing embodiments.

Figure 5:
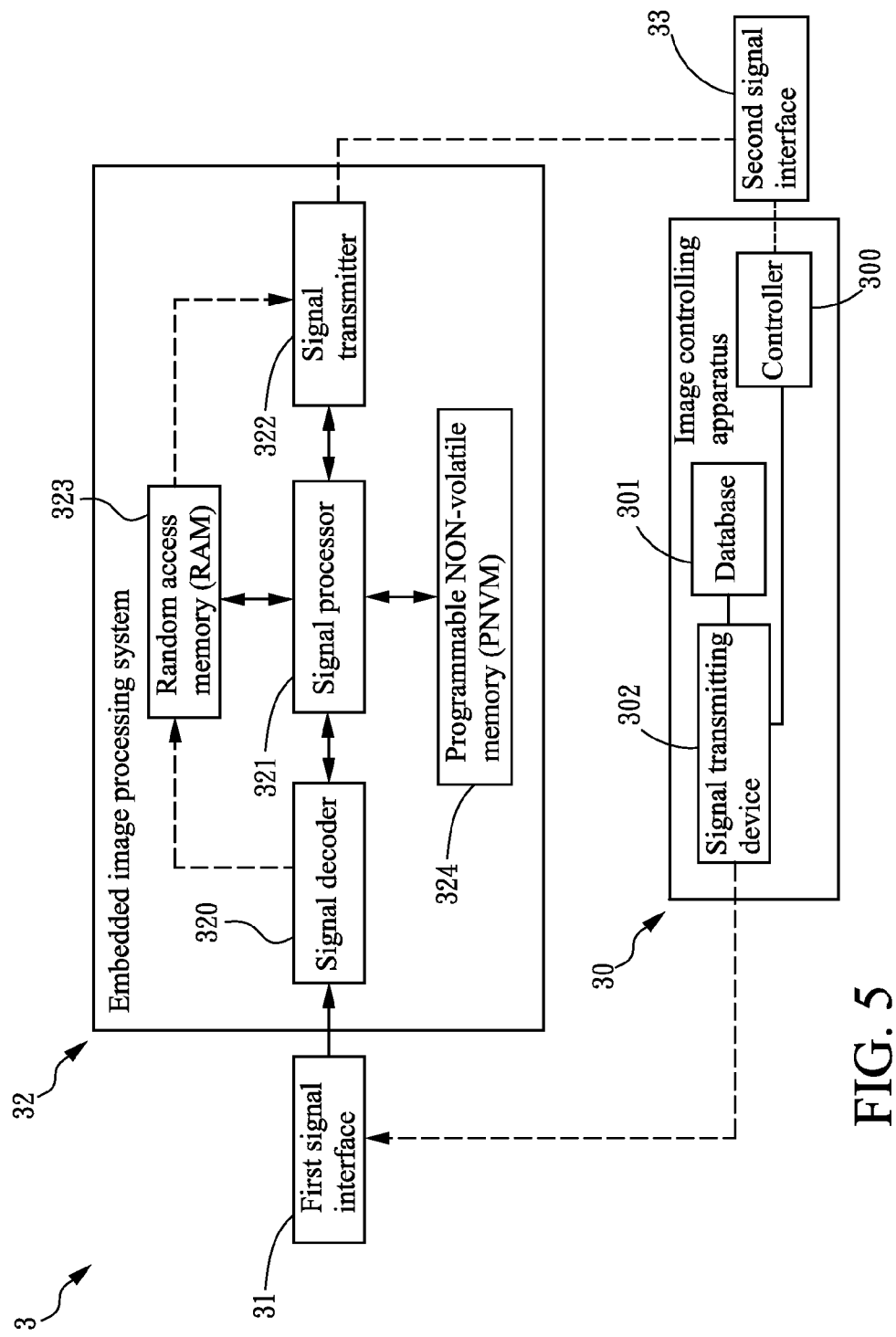
FIG. 5 is a schematic diagram showing a system for calculating an image recognition rate according to an embodiment of the present disclosure.

Please refer to FIG. 5, which is a schematic diagram showing a system for calculating an image recognition rate according to an embodiment of the present disclosure. It is noted that the system for calculating an image recognition rate 3 is provided for executing the steps shown in FIG. 2. As shown in FIG. 5, the system for calculating an image recognition rate comprises: an image controlling apparatus 30, a first signal interface 31, an embedded image processing system 32 and a second signal interface 33. The image controlling apparatus 30 is used in the step 20 for transmitting the confirmation signal and outputting a frame to the embedded image processing system 32 according to the control signal. The first signal interface 31 is electrically connected to the image controlling apparatus 30 for receiving the frame therefrom in a wired or wireless manner. In an embodiment, the image controlling apparatus 30 is electrically connected with the first signal interface 31 in a wired manner, whereas the first signal interface can be a universal serial bus (USB) interface, a D-sub terminal interface, or a digital visual interface (DVI).

The embedded image processing system 32 is electrically connected to the first signal interface for receiving the frame so as to be used for performing an image recognition operation upon the frame and thus generating a recognition result for the received frame while generating the control signal. The second signal interface 33, being electrically connected to the embedded image processing system 32 and the image controlling apparatus 30, is used for receiving the recognition result and the control signal while transmitting the control signal and the recognition result to the image controlling apparatus 30 where the recognition result is used as a basis for calculating an image recognition rate. It is noted that the second signal interface 333 can be a wired interface, such as a USB interface or a RS 232 interface or it can be a wireless interface capable of communicating with the embedded image processing system 32 in a wireless manner.

In an embodiment, the image controlling apparatus 30 further comprises: a controller 300, a database 301 and a signal transmitting device 302. The controller 300, being electrically connected with the second signal interface 33, is used for receiving the control signal and the recognition result to be used as basis for calculating the image recognition rate of each frame while generating the confirmation signal to the embedded image processing system 2. In addition, the controller 300 is enabled to transmit a frame to the first signal interface 31 using the signal transmitting device 302 according to the control signal, and also the signal transmitting device 302 is used for transmitting the confirmation signal to the first signal interface 31. The database 301, being electrically connected with the signal transmitting device 302, is used for storing the video containing a series of frames Operationally, when the controller 300 is directed by the control signal for transmitting a single frame to the first signal interface 31, it will sample the video for obtaining a frame with respect to a specific point of time so as to be transmitted to the first signal interface 31 through the signal transmitting device 302. It is noted that the image controlling apparatus 30, being a device with signal processing and transmitting abilities, is a device selected from the group consisting of: a personal computer, a notebook computer, a personal digital assistant (PDA), a workstation and a server.

Figure 3B:
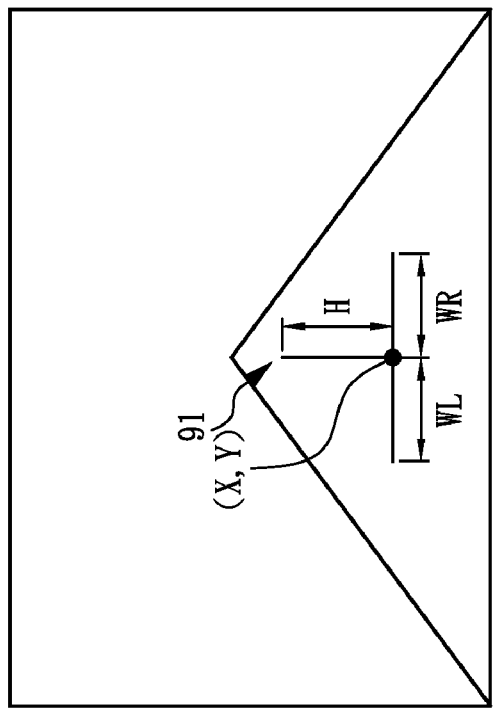
FIG. 3B is a schematic diagram showing a vehicle recognition result.
Figure 3A:
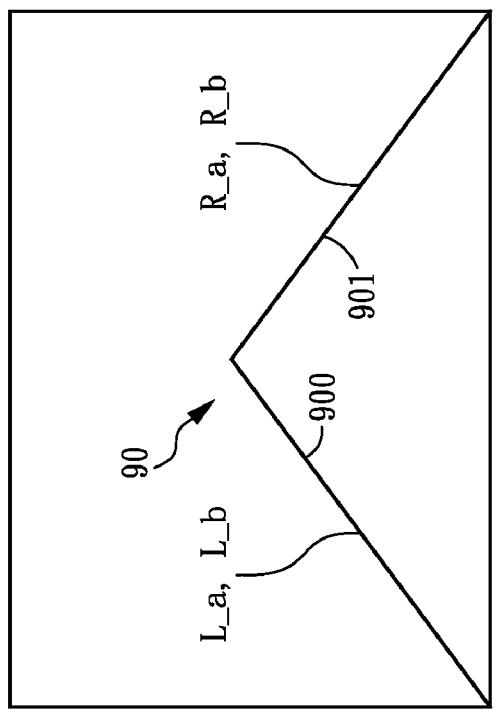
FIG. 3A is a schematic diagram showing a lane recognition result.

Moreover, the embedded image processing system 32 further comprises: a signal decoder 320, a signal processor 321, and a signal transmitter 322. The signal decoder 320, being connected with the first signal interface 31, is used for receiving the frame from the first signal interface 31 while converting the same into a digital image signal capable of being processed by the signal processor 321. The signal processor 321 is configured with an optimal recognition parameter and is used for performing an image recognition operation upon the digital image signal so as to form a recognition result, i.e. it is capable of performing the aforesaid step 23 for performing an image recognition operation upon the received frame so as to obtain a corresponding recognition result, as those exemplified in FIG. 3A and FIG. 3B. Clearly that the examples shown in FIG. 3A and FIG. 3B are examples of lane recognition, if human face is the target object for recognition, parameters relating to the locations of characteristics, such as the eyes, should be used as the recognition parameters, and also such parameters relating to the locations of the characteristics should be optimized by the steps depicted in FIG. 4.

In FIG. 5, the signal processor 321 is further connected to a random access memory (RAM) and a programmable non-volatile memory (PNVM) 324, in which the RAM 323 is used for registering temporally information that is required in any calculation performed in the signal processor 321. The PNVM 324 is used for storing any information generated from the calculations performed in the signal processor 321 in a permanent manner, or for storing system configuration. Moreover, the signal transmitter 322, being electrically connected to the signal processor 321 and the RAM 323, is substantially a two-way signal transmitting device capable of receiving control signal from the signal processor 321 and also the recognition results stored in the RAM 323.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. A method for calculating image recognition rate, comprises the steps of:

enabling an image controlling apparatus to output a frame in a set of frames to an embedded image processing system;

enabling the embedded image processing system to receive the frame so as to perform an image recognition operation upon the received frame;

enabling the image processing system to issue a control signal and a recognition result as well after completing the image recognition operation;

enabling the image controlling apparatus to output another frame in a set of frames to the embedded image processing system according to the control signal and the recognition result;

repeating the aforesaid steps for a plurality of times for generating a plurality of recognition results in correspondence to the plural image recognition operations performed during the repeating for recognizing each and every frame in the set of frames; and calculating an image recognition rate relating to a target object in the set of frames according to the recognition results from the embedded image processing system, wherein in a condition that the target object is selected to be a lane line, the recognition result should contain sufficient parameters capable of defining the position of the lane line in a reference coordinate system; and wherein the reference coordinate system is a Cartesian coordinate system, and the parameters are defined as the slopes and the interceptions relating to a left lane line and a right lane line of the same lane.

2. The method of claim 1, wherein the image controlling apparatus is enabled to output the frame to the embedded image processing system in a manner selected from the group consisting of: a wireless manner and a wired manner.

3. The method of claim 1, wherein the image controlling apparatus is enabled to output the frame to the embedded image processing system through a transmission interface selected from the group consisting of: a universal serial bus (USB) interface, a D-sub terminal interface, and a digital visual interface (DVI).

4. The method of claim 1, wherein the control signal and the recognition result is transmitted through a transmission interface selected from the group consisting of: a universal serial bus (USB) interface, and a RS232 interface.

5. The method of claim 1, wherein the control signal is enabled to be transmitted to the image controlling apparatus in a manner selected from the group consisting of: a wireless manner and a wired manner.

6. The method of claim 1, wherein the image controlling apparatus is a device selected from the group consisting of: a personal computer, an industrial computer, a notebook computer, and a personal digital assistant (PDA).

7. The method of claim 1, further comprising the step of:
optimizing parameters used in the recognition logic of the embedded image processing system according to the image recognition rate.

8. The method of claim 7, wherein the optimizing of the parameters used in the recognition logic of the embedded image processing system further comprising the steps of:
altering the parameters used in the recognition logic of the embedded image processing system while obtain image recognition rates in correspondence to the set of frames with the altered parameters; and
selecting the parameters whose corresponding image recognition rate is the largest to be the optimal recognition parameters for the embedded image processing system.

9. The method of claim 8, wherein the parameters can be defined as the threshold value of a bi-level thresholding for image recognition, contrast, brightness and the combination thereof.

10. A system for calculating image recognition rate, comprising:
an image controlling apparatus, capable of outputting a frame according to a control signal;
a first signal interface electrically connected to the image controlling apparatus, used for transmitting the frame;
an embedded image processing system, electrically connected to the first signal interface so as to receive the frame, used for performing an image recognition operation upon the frame and thus generating a recognition result for the received frame while generating the control signal;
a second signal interface, electrically connected to the embedded image processing system and the image controlling apparatus, used for receiving the recognition result and the control signal while transmitting the control signal and the recognition result to the image controlling apparatus where the recognition result is used as a basis for calculating an image recognition rate, wherein the recognition result should contain sufficient parameters capable of defining position of the target object in a reference coordinate system; and wherein in a condition that the target object is selected to be lane lines, the reference coordinate system is selected to be a Cartesian coordinate system and the parameters containing in the recognition result are defined as the slopes and the interceptions relating to a left lane line and a right lane line of the same lane.

11. The system of claim 10, wherein the image controlling apparatus further comprises:
a memory unit, for storing a plurality of the frames that are to be recognized.

12. The system of claim 10, wherein the first signal interface is enabled to received the frame in a manner selected from the group consisting of: a wireless manner and a wired manner.

13. The system of claim 10, wherein the image controlling apparatus is enabled to electrically connected to the first signal interface through an interface selected from the group consisting of: a universal serial bus (USB) interface, a D-sub terminal interface, and a digital visual interface (DVI).

14. The system of claim 10, wherein the second signal interface is an interface selected from the group consisting of: a universal serial bus (USB) interface, and a RS232 interface.

15. The system of claim 10, wherein the image controlling apparatus, being a device with signal processing and transmitting abilities, is a device selected from the group consisting of: a personal computer, a notebook computer, a personal digital assistant (PDA), and a workstation.

16. The system of claim 10, wherein the embedded image processing system further comprises:
a signal decoder, for receiving a frame while performing a conversion operation upon the received frame so as to form a digital image signal accordingly;
a signal processor, configured with an optimal recognition parameter, for performing an image recognition operation upon the digital image signal so as to form a recognition result; and
a signal transmitter, electrically connected to the signal processor for outputting the recognition result to the second signal interface.

17. The system of claim 16, further comprising: a random access memory (RAM) and a programmable non-volatile memory (PNVM).

18. A method for calculating image recognition rate, comprises the steps of:
enabling an image controlling apparatus to output a frame in a set of frames to an embedded image processing system;
enabling the embedded image processing system to receive the frame so as to perform an image recognition operation upon the received frame;
enabling the image processing system to issue a control signal and a recognition result as well after completing the image recognition operation;
enabling the image controlling apparatus to output another frame in a set of frames to the embedded image processing system according to the control signal and the recognition result;
repeating the aforesaid steps for a plurality of times for generating a plurality of recognition results in correspondence to the plural image recognition operations performed during the repeating for recognizing each and every frame in the set of frames;

calculating an image recognition rate relating to a target object in the set of frames according to the recognition results from the embedded image processing system; and optimizing parameters used in the recognition logic of the embedded image processing system according to the image recognition rate, comprising:

altering the parameters used in the recognition logic of the embedded image processing system while obtain image recognition rates in correspondence to the set of frames with the altered parameters; and selecting the parameters whose corresponding image recognition rate is the largest to be the optimal recognition parameters for the embedded image processing system, wherein the parameters can be defined as the threshold value of a bi-level thresholding for image recognition, contrast, brightness and the combination thereof.

* * * * *